(No Model.) 3 Sheets—Sheet 2.
C. S. BRADLEY.
ALTERNATING CURRENT MOTOR.

No. 551,810. Patented Dec. 24, 1895.

Witnesses
H. W. Lloyd.
John P. Nordström.

Inventor
Charles S. Bradley
By his Attorney (No Model.) 3 Sheets—Sheet 3.
C. S. BRADLEY.
ALTERNATING CURRENT MOTOR.

No. 551,810. Patented Dec. 24, 1895.

Witnesses
I. W. Lloyd.
John P. Nordstrom.

Inventor
Charles S. Bradley.
By his Attorney

UNITED STATES PATENT OFFICE.

CHARLES S. BRADLEY, OF AVON, NEW YORK.

ALTERNATING-CURRENT MOTOR.

SPECIFICATION forming part of Letters Patent No. 551,810, dated December 24, 1895.

Application filed September 12, 1893. Serial No. 485,311. (No model.)

*To all whom it may concern:*

Be it known that I, CHARLES S. BRADLEY, a citizen of the United States, residing in Avon, in the county of Livingston and State of New York, have invented certain new and useful Improvements in Alternating-Current Motors, of which the following is a specification.

This invention relates to polyphase alternating-current motors, its object being to dispense with the resistance ordinarily employed in the secondary circuit to vary the torque, and to dispense with any external electrical connections whatever for the secondary circuit, and yet permit the motor to start with strong torque.

In carrying out the invention I make the primary element the fixed element of the motor and mount the secondary element upon a shaft carrying two or more series of contacts with which the terminals of several secondary circuits may be brought into engagement by different modes of coupling to produce different degrees of magnetization on the secondary element and thus prevent the secondary poles overpowering the primary poles at low speeds.

In a prior application filed jointly by myself and Fred S. Hunting, Serial No. 475,586, filed on or about the 26th day of May, 1893, was described a polyphase alternating-current motor in which the secondary element was wound with several groups of coils, the terminals of which were carried to an external coupling-switch by which they might be connected in various relations so as to oppose or assist one another in polarizing the secondary element. In the construction therein described the primary element was made the revolving element of the motor, which necessitated leading the polyphase currents to the primary circuits through contact-rings carried by the revolving shaft. Such contact-rings are dispensed with in my present invention.

The several features of novelty of the invention will be more particularly hereinafter described and will be definitely indicated in the claims appended to this specification.

Figure 1:
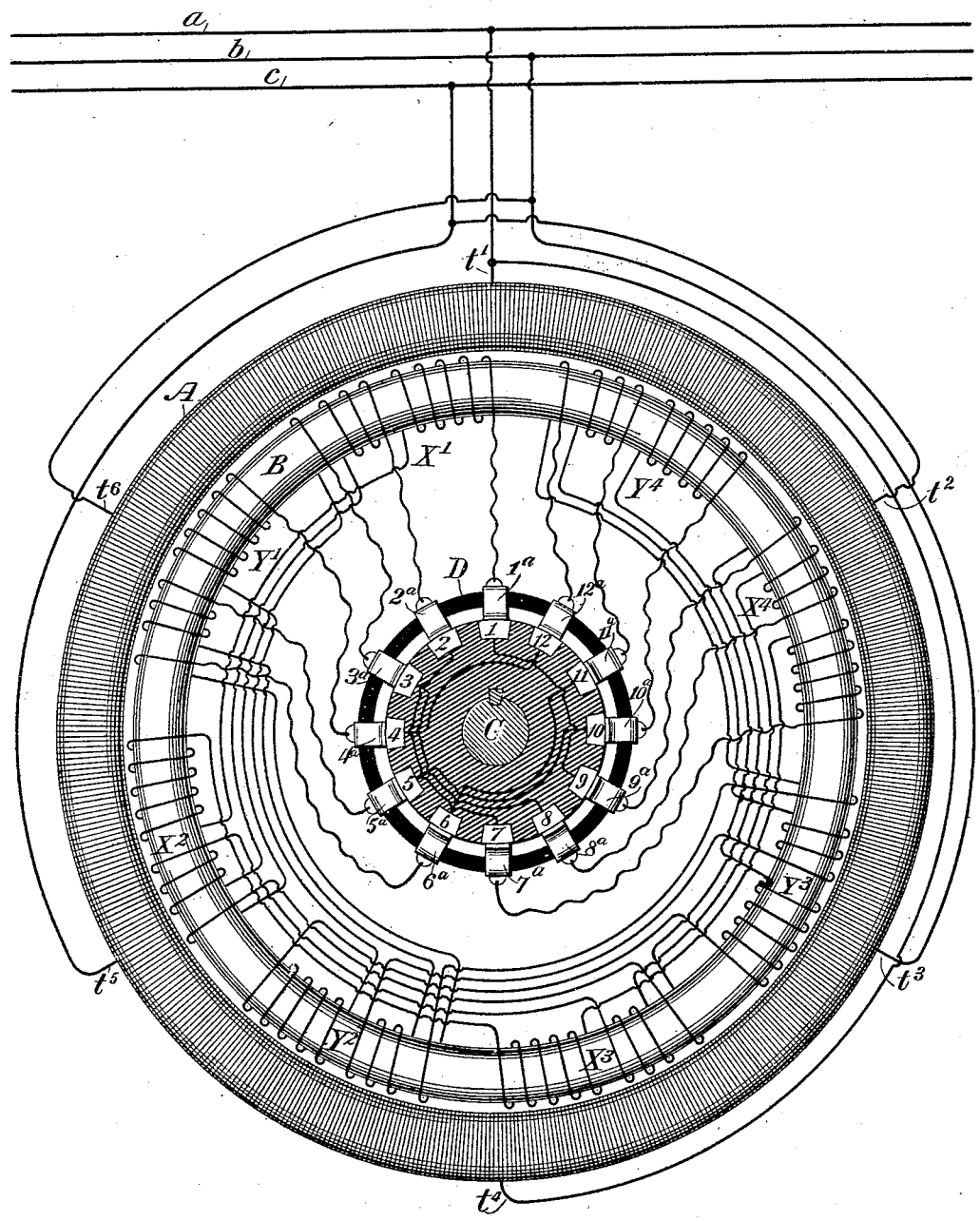
Figure 2:
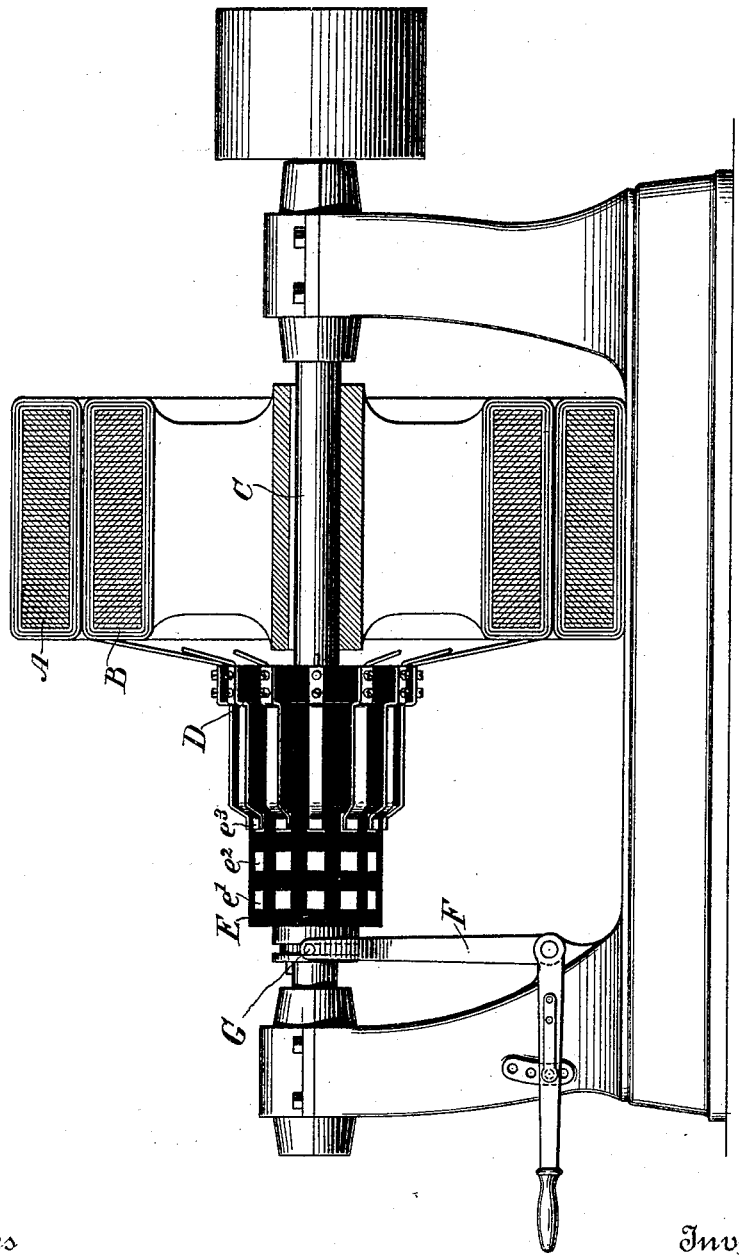
Figure 3:
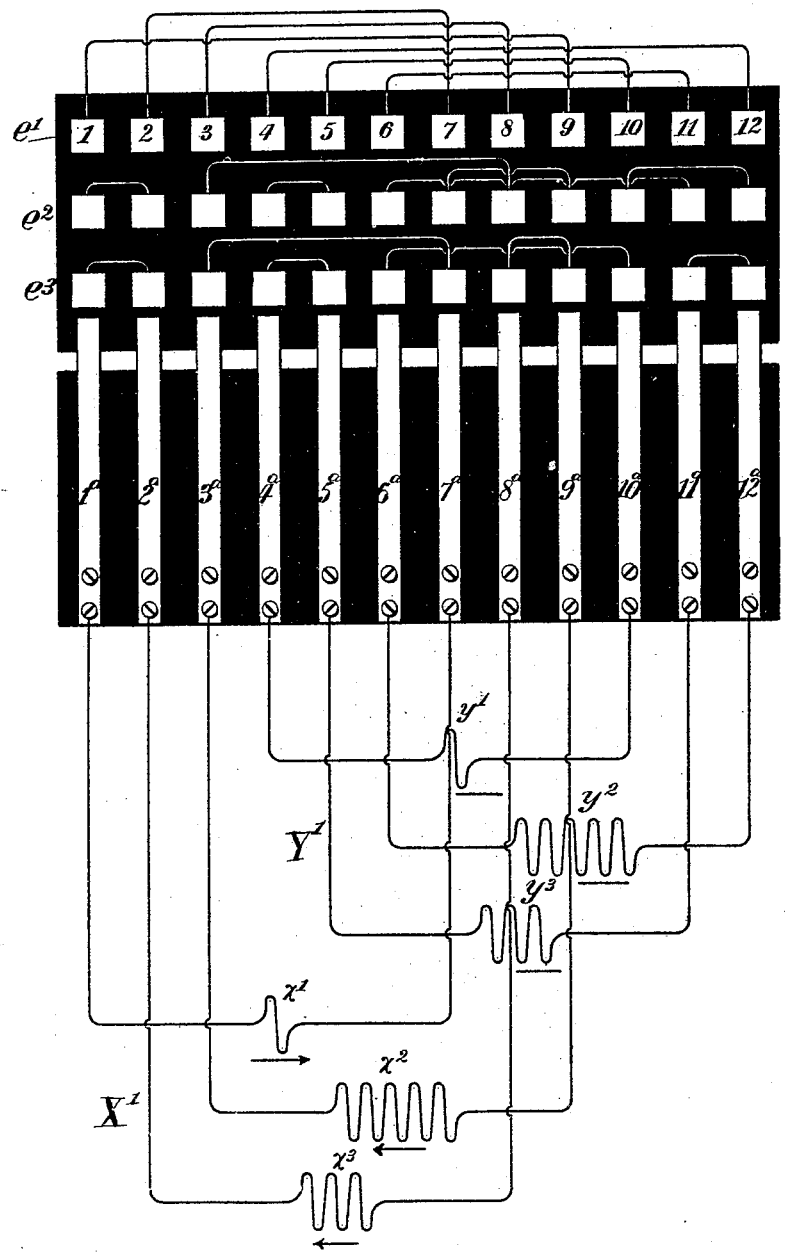

In the accompanying drawings, which illustrate the invention, Figure 1 is a diagrammatic view of a motor embodying my improvements. Fig. 2 is a side elevation, partly in section, of such a motor; and Fig. 3 is a development of the switch device carried by the revolving shaft, showing diagrammatically the several circuits and the mode of connecting them in various ways so as to vary the number of effective turns in the secondary winding.

Referring first to Fig. 1, $a\ b\ c$ represent the supply-wires of a polyphase circuit, in this instance a triphase circuit. The primary element A of the motor will be fixed upon a suitable base and may be wound with an open or closed coil system. As shown the primary element is wound with a closed circuit connected with the three supply-wires $a\ b\ c$, the winding being adapted to develop four progressive or rotating poles. This may be readily done by tapping the closed winding at six equidistant points $t'\ t^2\ t^3\ t^4\ t^5\ t^6$, and connecting the wire $a$ of the triphase circuit with points $t'$ and $t^4$, the wire $b$ with points $t^3$ and $t^6$, and the wire $c$ with $t^2$ and $t^5$. With this system of connections if current be supposed to be entering at any given instant on the wire $a$, and returning by wires $b$ and $c$, it will enter the winding at points $t'$ and $t^4$ in multiple arc, and return to the main $b$ at points $t^3$ and $t^6$, and to the main $c$ at points $t^2$ and $t^5$, thus developing four poles in the ring-core inclosed in the primary winding. These four poles will have a progressive movement through the ring under the fluctuations of the triphase current.

The secondary element B is mounted upon a shaft C so as to rotate within the primary element. This element is provided with two independent windings $X'\ X^2\ X^3\ X^4, Y'\ Y^2\ Y^3\ Y^4$, relatively displaced on the ring-core so as to have induced therein secondary currents having a quarter-phase difference, and each circuit is composed of several sections, the terminals of which lead to brushes $1^a\ 2^a\ 3^a\ 4^a\ 5^a$, &c., to $12^a$ mounted upon an insulating-ring D fixed to the shaft. Splined upon the shaft and adapted to slide thereon is an insulating-collar E provided with three circumferential rows of contacts $e'\ e^2\ e^3$, (see Fig. 2,) any one of which may be shifted by means of the lever F into engagement with the contact-springs $1^a\ 2^a\ 3^a$, &c. The shifting-lever F is provided with a suitable handle and latch for locking it in different positions of adjustment, and carries at its extremity a pin G entering a circumferential groove formed in a bushing upon which the collar E is rigidly mounted. The two independent windings $X'$, &c., and $Y'$, &c., have in each quarter of the secondary element, in the case of a four-pole motor, as the present, several sets of convolutions having different magnetizing values—that is to say, different numbers of turns. For example, in each quarter of the ring we will have three sets of convolutions in the X system, and three sets of convolutions in the Y system, as seen at $X'$ $X^2$ $X^3$ $X^4$ and $Y'$ $Y^2$ $Y^3$ $Y^4$.

Of course for a motor having a larger or smaller number of poles the number of ring-sections would correspondingly vary.

It will be seen that when the switch is adjusted so that any one of the series of contacts $e'$ $e^2$ $e^3$ comes into engagement with the brushes $1^a$ $2^a$ $3^a$, &c., two independent closed circuits will be formed on the secondary element. Taking, for example, the condition of adjustment illustrated in Fig. 1, and starting from brush $1^a$, we will pass through the first group of convolutions of $X'$, thence reversely through the same group of $X^2$, thence directly through the same group of $X^3$, thence reversely through the same group of $X^4$, thence to brush $7^a$ and contact-block 7, and by fixed connection on the under side of sleeve E to contact-block 2 and brush $2^a$, thence to second sections of $X'$ $X^2$ $X^3$ $X^4$, and through it similarly to the first section, thence to contact-brush $8^a$ and contact-block 8, and by fixed connection to contact-block 3 and brush $3^a$ to the third section of $X'$ $X^2$ $X^3$ $X^4$, thence to contact-brush $9^a$ and contact-block 9, and by fixed connection back to the point of starting through contact-block 1 to brush $1^a$. By tracing the system of connections for the winding $Y'$ $Y^2$ $Y^3$ $Y^4$ we will find a similar arrangement—that is to say, the several sections of each winding $X'$ $X^2$ $X^3$ $X^4$ and $Y'$ $Y^2$ $Y^3$ $Y^4$ will be connected by the brushes and contact-blocks in such a way as to form two independent closed circuits, and inasmuch as the two circuits are relatively displaced a distance on the ring-core to develop induced currents having a quarter-phase difference, the two induced circuits will co-operate to produce a magnetization in the secondary element which will not fluctuate greatly for any given speed of the motor. This degree of magnetization may, however, be varied at constant speed by shifting the sleeve E so as bring another group of contacts—say $e^2$—into engagement with the brushes $1^a$ $2^a$ $3^a$, &c.

In the system hereinabove traced the coils are all coupled in such a way as to assist one another in magnetizing the secondary element, but by suitably connecting the different series of contacts $e'$, $e^2$, or $e^3$ some of the sections of $X'$ and $Y'$ may be made to oppose the magnetizing effort developed by the other sections, and thus vary the degree of magnetization induced in the secondary element. This will be better understood by an examination of Fig. 3, where it will be seen, when the brushes $1^a$ $2^a$ $3^a$, &c., bear upon contact-blocks $e'$, the coils of winding $X'$ and $Y'$ will be connected in two independent circuits in such a way as to assist one another. When, however, the brushes $1^a$ $2^a$ $3^a$, &c., bear upon series $e^2$ we will then, starting from brush $1^a$, go through the section $x'$ in the direction of the arrow into brush $7^a$, thence to contact-block 7 of $e^2$, thence by fixed connection to contact-block 9 of $e^2$, and by brush $9^a$ through $x^2$ in a reverse direction into brush $3^a$, contact-block 3 of $e^2$, thence by fixed connection to contact-block 8, and by brush $8^a$ through section $x^3$ in a direction indicated by the arrow, and thence by brush $2^a$ to contact-block 2, and by fixed connection to contact-block 1 back to brush $1^a$, which was the point of starting. Thus it will be seen that the sections $x^2$ $x^3$ co-operate in magnetizing the secondary element and are opposed by section $x'$. By tracing sections $y'$ $y^2$ $y^3$ of winding $Y'$ it will be seen that a similar condition of affairs will exist. By adjusting the series of contacts $e^3$ into engagement with the contact-springs two of the sections may be made to oppose the larger one. Thus if we have in the several sections a number of convolutions in the proportion of one, three and five, as illustrated in Fig. 1, we may have three different magnetizing values by forming three series of contacts, so that in the several positions of adjustment we will have $5+3+1=9$ effective convolutions, or $5-(3+1)=1$ effective convolution, or $5+1-3=3$ effective convolutions. Thus when starting the motor into operation the switch will be adjusted so that the second condition will be brought about and a low magnetizing value will be given to the coil system on the secondary element; and this is as it should be, for the reason that when starting an induction motor into operation the slip is so great that strong induced currents are developed, and if the winding has a low magnetizing value a better co-operation of the poles of the primary and secondary elements will result. As the motor rises in speed the switch will be shifted by means of the lever F, so that the third condition is developed—that is to say, there will be a larger number of effective turns, which is as it should be, for the reason that the rotary element has now risen in speed so that the degree of slip is less, and consequently a lower degree of induction exists. A final adjustment may then be made by which all of the turns will be rendered effective, and as the degree of slip is comparatively slight at high speed, the weaker induced current will be thus enabled to maintain the magnetization of the secondary element at a value which will develop strong torque.

It will thus be seen that the motor may be given a strong torque whether starting or at medium speed or at full speed, by simply shifting the lever F so as to bring the proper group of contacts into co-operative relation to the terminals of the secondary element.

Having thus described my invention, what I claim as new, and desire to secure by Letters Patent, is—

1. An alternating current induction motor comprising a primary element and a revolving secondary element carrying a sliding switch cooperating with two or more series of contacts for varying the number of effective turns on the secondary winding.

2. An alternating current induction motor comprising a fixed primary element and a movable secondary element carrying a switch, and two or more series of contacts for grouping the secondary windings to vary the number of effective turns on the secondary winding.

3. An alternating current induction motor comprising a fixed primary element, a revolving secondary element provided with a sectional winding, the several sections having different numbers of turns, a revolving switch carried by the revolving shaft having two or more series of contacts cooperating with the section terminals to vary the number of effective turns, and means for shifting any set of contacts into engagement with the terminals.

4. An alternating current induction motor comprising a fixed primary element, and a revolving secondary element provided with a plurality of independent sectional windings relatively displaced to produce differential phase induced currents, and a sliding switch mounted on the revolving element for coupling the several sections of the windings in different relations to vary the number of effective turns.

5. An alternating current induction motor comprising a fixed primary element having a polyphase winding to develop a shifting or revolving magnetic field, a revolving secondary element provided with a plurality of independent sectional windings relatively displaced to produce differential phase induced currents, two or more series of contacts for grouping the several sections to vary the number of effective magnetizing turns, and means for bringing any set of contacts into engagement with the terminals of the sectional windings.

6. An electric motor having a sectional winding on its revolving element, a switch fixed to the element for varying the number of effective turns in said winding, and means for adjusting the switch during its revolution.

In testimony whereof I have hereunto subscribed my name this 8th day of September, A. D. 1893.

CHARLES S. BRADLEY.

Witnesses:
J. D. CARSON,
CYRUS ALLEN.